US012692899B2

(12) United States Patent
    Katsaros

(10) Patent No.: US 12,692,899 B2
(45) Date of Patent: Jul. 28, 2026

(54) BEARING ASSEMBLY

(71) Applicant: AKTIEBOLAGET SKF, Gothenburg (SE)

(72) Inventor: Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 152 days.

(21) Appl. No.: 18/483,867

(22) Filed: Oct. 10, 2023

(65) Prior Publication Data

US 2024/0125353 A1    Apr. 18, 2024

(30) Foreign Application Priority Data

Oct. 18, 2022    (DE) .......................... 102022211031.5

(51) Int. Cl.
    *F16C 19/52*        (2006.01)
    *F16C 19/38*        (2006.01)
(52) U.S. Cl.
    CPC .......... *F16C 19/525* (2013.01); *F16C 19/386* (2013.01); *F16C 2202/22* (2013.01); *F16C 2326/02* (2013.01)
(58) Field of Classification Search
    CPC .. F16C 2326/02; F16C 19/525; F16C 19/386; F16C 2202/22; F16C 33/7813; F16C 37/007
    See application file for complete search history.

(56) References Cited

U.S. PATENT DOCUMENTS 11,028,875 B1 *    6/2021    Chinitz ................. F16C 19/364
2002/0015545 A1    2/2002    Griseri et al.

| 2012/0204638 A1 * | 8/2012 | Kakuda ................... F16C 33/78 |
| | | 73/494 |
| 2017/0114832 A1 * | 4/2017 | Katsaros ............. F16C 33/7813 |
| 2021/0215201 A1 * | 7/2021 | Rybski ................. F16C 19/186 |

FOREIGN PATENT DOCUMENTS

EP    2400172 A1 * 12/2011    ............ F16C 19/543

OTHER PUBLICATIONS

Office Action mailed Sep. 20, 2024, in related U.S. Appl. No. 18/324,721.

* cited by examiner

*Primary Examiner* — John Olszewski
*Assistant Examiner* — Aimee Tran Nguyen
(74) *Attorney, Agent, or Firm* — J-TEK LAW PLLC; Scott T. Wakeman; Mark A. Ussai

(57)                    ABSTRACT

A bearing assembly, preferably a wheel bearing assembly, includes at least one first ring and at least second ring, at least one of the first and second rings being rotatable and a bearing interior being defined between the first and second rings. The first ring(s) are designed to be attached with press fit to a component formed of a first material with a first coefficient of thermal expansion, the first ring (s) being formed of a second material with a second coefficient of thermal expansion different than, preferably lower than, the first coefficient of thermal expansion. At least one seal unit is provided to seal an axially outer side of the bearing assembly and includes a carrier element formed of a third material with a third coefficient of thermal expansion, the third coefficient of thermal expansion is at least as high as the first coefficient of thermal expansion.

17 Claims, 2 Drawing Sheets

BEARING ASSEMBLY

CROSS-REFERENCE

This application claims priority to German patent application no. 102022211031.5 filed on Oct. 18, 2022, the contents of which are fully incorporated herein by reference.

BACKGROUND OF THE INVENTION

The present invention relates to bearings, and more particularly to wheel bearing assemblies.

In many manufacturing industries, such as in the automotive industry, it is desirable to design components to be as light as possible in order to save energy and/or fuel. For this reason, components are often used together that are made of different materials, and therefore also have different coefficient of thermal expansions. A conventional technique for connecting two components together is commonly referred to as "press fit", in which the two components are pressed together. However, when the two interconnected components have different coefficients of thermal expansion, particularly at high operating temperatures, the component with the higher coefficient of thermal expansion expands to a greater degree than the component with the lower coefficient of thermal expansion. Conversely, at lower operating temperatures, the component with the higher coefficient of thermal expansion shrinks to a greater degree than the component with the lower coefficient of thermal expansion. This effect reduces the amount or tightness of the press fit under rising or increasing temperatures, and on the other hand, increases the tightness of the press fit with decreasing or falling temperatures.

For example, in the case of a wheel bearing assembly with a light-metal hub and a bearing unit with bearing rings made of steel pressed into the light-metal hub, the light metal hub can expand so much at high operating temperatures that the bearing unit rotates within the hub separately of the hub components. In order to ensure a sufficiently secure press fit of the bearing unit in the hub at higher operating temperatures, a relatively high tightness of the fit must therefore be provided between the hub and the bearing unit, which, however, could become so extreme at low operating temperatures that circumferential stresses in the hub reach or exceed the material limit, and thus cracking can result. Even if the light metal hub does not crack, the high degree of shrinkage of the hub can cause the bearing unit to be exposed to high friction or even jam. For this reason, the operating temperature range in the upper and/or lower boundary is restricted because it is not possible to cover the complete range without risk with an overlap.

SUMMARY OF THE INVENTION

It is therefore an object of the present invention to provide an improved bearing assembly that can be secured by press fit in another component having a different coefficient of thermal expansion than the bearing assembly throughout the operating temperature range.

This object is achieved by proving a bearing assembly, in particular a wheel bearing assembly, is proposed that includes at least one first ring and at least one second ring, wherein the at least one first ring and the at least one second ring are rotatable relative to each other about a rotational axis and that define a bearing interior between them. In particular, the first ring can be a rotating ring, and the second ring can be a stationary ring. However, it is also conceivable that the first ring is a stationary ring, and the second ring is a rotating ring. The component can also be part of a larger device. For example, the component can be a hub, a shaft, or the like. The first ring is designed to be attached to a component by press fit, wherein the component is formed from a first material with a first coefficient of thermal expansion. Furthermore, the at least one ring is formed from a second material with a second coefficient of thermal expansion that is different from the first coefficient of thermal expansion. The second coefficient of thermal expansion is preferably lower than the first coefficient of thermal expansion. Furthermore, the bearing assembly comprises at least one seal unit that seals the bearing assembly on an axially outer side. For example, the at least one seal unit can be configured to seal the bearing interior.

Furthermore, the bearing assembly can be configured as a rolling-element bearing assembly that includes at least one first row of rolling elements and one second row of rolling elements. The rolling elements can in particular be tapered rollers, cylindrical rollers, and/or balls. Furthermore, the first bearing ring can be a two-part ring with a first part and a second part.

In order to reliably secure the bearing assembly in the component by press fit over the entire operating temperature range, the at least one seal unit includes a carrier element that is formed from a third material with a third coefficient of thermal expansion, wherein the third coefficient of thermal expansion is substantially at least as high as the first coefficient of thermal expansion.

In the following, the expression "the third coefficient of thermal expansion is substantially at least as high as the first coefficient of thermal expansion" is understood to mean that the third coefficient of thermal expansion is at most 30%, preferably 20%, still more preferably 10%, lower than the first coefficient of thermal expansion. In other words, the third coefficient of thermal expansion can have a value that corresponds to at least 70%, preferably 80%, even more preferably 90% of the value of the first coefficient of thermal expansion.

The third coefficient of thermal expansion can preferably be substantially equal to the first coefficient of thermal expansion. In the following, the term "substantially equal coefficient of thermal expansion" is understood to mean that the first and the third coefficient of thermal expansion do not differ from each other by more than 30%, preferably 20%, still more preferably 10%.

Since the carrier element has a coefficient of thermal expansion that is substantially at least as high as the coefficient of thermal expansion of the component, the carrier element of the at least one seal unit expands together with the component at high operating temperatures, or contracts together with the component at low operating temperatures. That is, at high operating temperatures the carrier element of the at least one seal unit expands to a greater degree than the at least one first ring, with the result that the carrier element of the at least one seal unit can secure the first ring in the component. A secure fit of the first ring in the component can thus be guaranteed, even when, due to the high operating temperature, the component expands to a greater degree than the at least one first ring. In the case of a low operating temperature, the carrier element of the at least one seal unit contracts together with the component. This makes it possible to avoid a failure of the first component and/or a jamming or disrupting of the bearing function.

The carrier element is preferably inserted with a press fit on an axially outer side of the bearing assembly. In particular, the carrier element can be disposed on a shoulder of the at least one first ring. The bearing assembly can preferably include more than one seal unit. For example, the bearing assembly can be provided with a first and a second seal unit, wherein the first seal unit is disposed on a first axially outer side of the bearing assembly, and the second seal unit is disposed on a second axially outer side opposite the first axially outer side. This makes it possible to ensure, on the one hand, particularly good sealing of the bearing interior and, on the other hand, good securing of the first ring in the component at high operating temperatures.

Furthermore, at least one seal lip can be disposed on the carrier element that is configured to seal the bearing interior. The at least one seal lip can be attached to the carrier element, for example, by adhering, vulcanizing, fasteners, and/or clamping. In particular, a separate clamp element can be provided that clamps the at least one seal lip onto the carrier element. Furthermore, more than one seal lip can also be disposed on the carrier element.

According to a further embodiment, the carrier element includes at least one first leg that extends axially, wherein the at least one first leg sealingly abuts against a first ring. For example, the at least one first leg can be disposed in a region in which a material thickness in the radial direction of the at least one first ring is as low as possible. For example, the at least one first leg can be disposed in a recess and/or a groove in the at least one first ring. This has the advantage that the carrier element can more easily deform the at least one first ring in order to secure the position of the at least one first ring in the component. In the region in which the at least one leg of the carrier element abuts against the first ring, the at least one first ring preferably has a lower material thickness in the radial direction. For example, the side of the at least one first ring facing the bearing interior can be provided with a recess into which the carrier element is inserted. The carrier element is preferably inserted into the at least one recess with a press fit.

The carrier element preferably includes at least one second leg that extends radially from the first leg, wherein an annular gap is formed radially, or in the radial direction, between the second leg and the second ring. This makes it possible to further reduce the risk that external impurities, such as dust, dirt, and other particles reach the at least one seal lip and damage it and/or penetrate into the bearing interior. In particular, the second leg can be formed one-piece with the first leg. Alternatively the second leg can be configured as a separate clamping ring that is attached to the first leg by press fit. The clamping ring is preferably formed from a fourth material with a fourth coefficient of thermal expansion, wherein the fourth coefficient of thermal expansion is substantially at least as high as the first coefficient of thermal expansion. In addition thereto, the clamping ring can be advantageously configured to attach the at least one seal lip to the carrier element. Since the second leg formed as separate clamping ring has a coefficient of thermal expansion that is higher than the coefficient of thermal expansion of the first ring, it can furthermore also be ensured that a secure fit of the at least one seal lip can be guaranteed even when the at least one seal lip is formed form a material that can be attached only poorly, or not at all, to the carrier element by adhering or vulcanizing.

Furthermore, the at least one seal unit can include at least one flinger. The at least one flinger can include an axially extending section and a radially extending section, wherein the axially extending section sealingly abuts or engages against the second ring and is configured to form a slip surface for at least one seal lip, and the radially extending section is configured to form a gap with the carrier element.

In particular, when the at least one flinger or the at least one seal unit is disposed with the at least one flinger on the rotating ring, the at least one flinger is configured to fling or direct particles, streaming in from outside onto the flinger, away from the seal unit so that the risk that the particles penetrate into the seal unit can be further reduced. This makes it possible to further reduce the risk that external impurities, such as dust, dirt, and other particles reach the at least one seal lip and damage it and/or penetrate into the bearing interior. The radial section can be disposed, for example, on an axially outer side of the carrier element. The risk that external impurities penetrate into the bearing interior can thereby be reduced even further. Alternatively the radial section can extend so far in the radial direction that a gap is formed between a radial end of the radial section and the carrier element.

According to a further embodiment, the third coefficient of thermal expansion is substantially equal to the first coefficient of thermal expansion, and/or the fourth coefficient of thermal expansion is substantially equal to the first coefficient of thermal expansion. The first material and the third material are preferably identical to each other. Alternatively or additionally, the first material and the fourth material are identical to each other. For example, the component and the carrier element can be shaped from the same casting compound and/or from the same mold. Furthermore, the first material, the third material, and the fourth material can each be a light metal, such as, for example, aluminum, an aluminum alloy, and/or a magnesium alloy, and the second material can be steel, such as, for example, bearing steel.

According to a further embodiment, the component is a hub of a wheel bearing assembly. In particular, the wheel bearing assembly can be used in a motor vehicle, such as, for example, a truck.

According to a further aspect of the invention, a wheel bearing assembly is proposed that includes a hub that is connectable to a wheel and comprises an above-described bearing assembly, in which the first ring of the bearing assembly is inserted into the hub with press fit.

Further advantages and advantageous embodiments are specified in the description, the drawings, and the claims. Here in particular the combinations of features specified in the description and in the drawings are purely exemplary, so that the features can also be present individually or combined in other ways.

BRIEF DESCRIPTION OF THE SEVERAL VIEWS OF THE DRAWINGS

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

5

Figure 5:
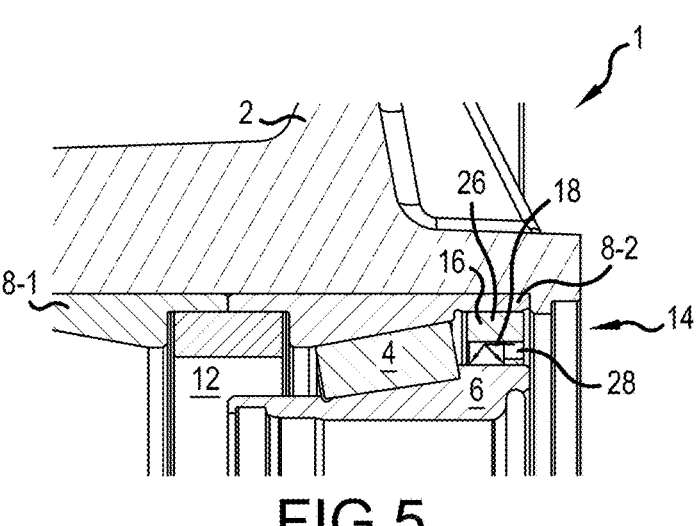

FIG. 5 shows a schematic sectional view through a bearing assembly according to a fifth embodiment.

DETAILED DESCRIPTION OF THE INVENTION

Figure 1:
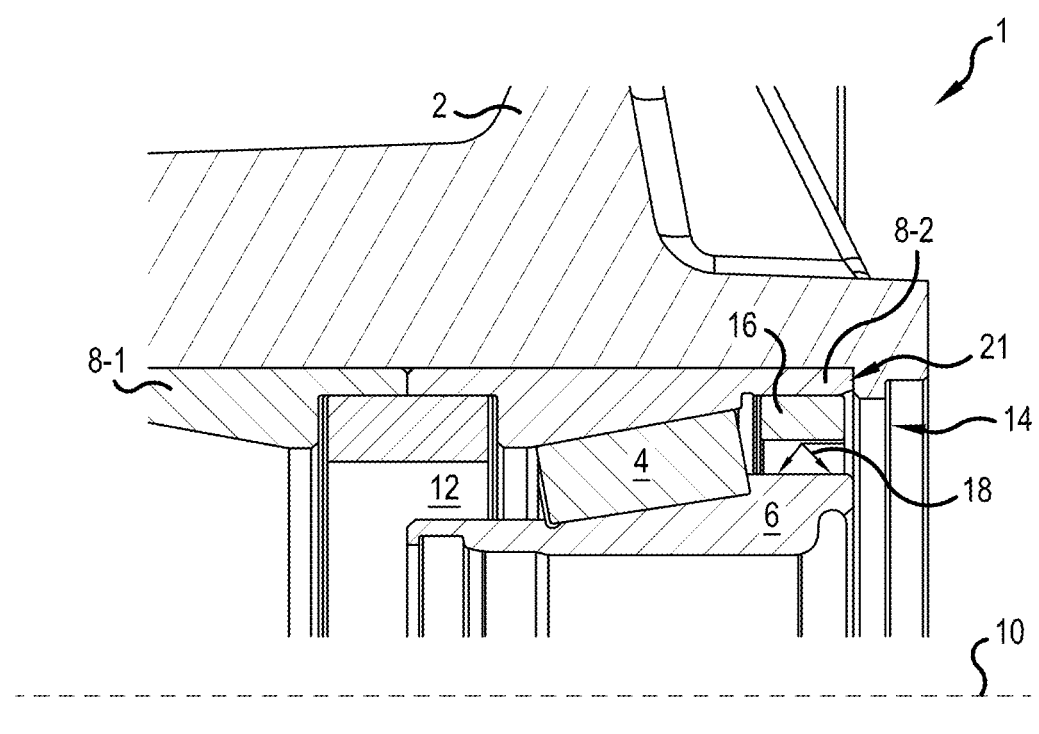
FIG. 1 shows a schematic sectional view through a bearing assembly according to a first embodiment.

In the following, identical or functionally equivalent elements are designated by the same reference numbers. FIG. 1 shows a bearing assembly 1, in particular a wheel bearing assembly, that can be used in motor vehicles, such as, for example, a truck. The bearing assembly 1 comprises a hub 2 that is formed from a first material with a first coefficient of thermal expansion. For example, the hub 2 can be formed from a light metal, such as for example, aluminum, an aluminum alloy, a magnesium alloy, etc. The hub 2 includes a plurality of attachment openings (not shown), via which it is connectable to a wheel (not shown).

Furthermore, the bearing assembly 1 comprises a first ring 8 and a second ring 6, wherein the first ring 8 and the second ring 6 are rotatable relative to each other about a rotational axis 10 and define a bearing interior 12 between them. In FIG. 1, the first ring 8 is a two-part ring and includes a first part 8-1 and a second part 8-2. Alternatively, the first ring 8 could also be a one-part ring. Furthermore, in FIG. 1, the first ring 8 is a rotating ring and the second ring 6 is a stationary ring, although alternatively, the first ring 8 may be a stationary ring and the second ring 6 may be a rotating ring. The first ring 8 is designed to be attached in the hub 2 with press fit. Furthermore, the first ring 8 is formed from a second material with a second coefficient of thermal expansion that is different from the first coefficient of thermal expansion. In particular, the first coefficient of thermal expansion is higher than the second coefficient of thermal expansion. For example, the first ring 8 is manufactured from a bearing steel.

In FIG. 1, the bearing assembly 1 is a rolling-element bearing assembly that includes a first row of rolling elements 4 and a second row of rolling elements 4. The rolling elements 4 may be tapered rollers, cylindrical rollers, balls, needles and/or any other known type of rolling elements, each one of the first and second rows including the same type or different types of rolling elements 4. Alternatively, the bearing assembly 1 can also include only a single row of rolling elements.

In order to reliably protect the bearing interior 12 of the bearing assembly 1 from external contaminants, such as, for example, dust, dirt, water, and other particles, the bearing assembly 1 includes a seal unit 14 that seals the bearing assembly 1 on an axially outer side. The seal unit 14 includes a carrier element 16 and at least one seal lip 18. For example, the seal unit 14 can include two or more seal lips 18, FIG. 1 showing a seal unit 14 that includes two seal lips 18. The seal lip(s) 18 can be attached to the carrier element 16, for example, by adhesive bonding, vulcanization, and/or clamping.

At the same time, in order to reliably secure the first ring 8 in the hub 2 over the entire operating temperature range by a press fit, the seal unit 14 includes a carrier element 16 that is formed from a third material with a third coefficient of thermal expansion, wherein the third coefficient of thermal expansion is substantially at least as high as the first coefficient of thermal expansion. In FIG. 1, the carrier element 16 is also manufactured from light metal, preferably from the same light metal as the hub 2. Of course, the bearing assembly 1 can also include more than one seal unit 14. For example, the bearing assembly 1 can be provided with a seal unit 14 on each one of the two axially outer sides or ends.

Since the carrier element 16 has a coefficient of thermal expansion that is substantially at least as high as the coefficient of thermal expansion of the hub 2, the carrier element 16 expands together with the hub 2 at high operating temperatures, or contracts with the hub 2 at low operating temperatures. That is, at high operating temperatures, the carrier element 16 expands to a greater degree than the first ring 8, with the result that the carrier element 16 deforms the first ring 8. A secure fit of the bearing assembly 1 in the hub 2 can thus be ensured, even when, due to the high operating temperature, the hub 2 expands to a greater degree than the first ring 8. In the case of a low operating temperature, the carrier element 16 contracts together with the hub 2, with the result that the deformation of the first ring 8 decreases with decreasing temperatures. As a result, a failure of the hub 2 and/or a jamming or disrupting of the bearing function of the bearing assembly 1 is avoided.

In FIG. 1, the carrier element 16 is inserted with a press fit on the axially outer side of the bearing assembly 1 to secure the seal unit 14 in the bearing assembly 1, and is in sealing contact with the first ring 8. As can be seen in FIG. 1, the carrier element 16 is preferably disposed on a shoulder 21 of the first ring 8, and most preferably press fit to the first ring 8 such that a portion of the ring 8 is disposed between the carrier element 16 and the component 2. In particular, the first ring 8 has a reduced material thickness in the region of the shoulder 21 in the radial direction so that in the case of an expansion due to operating temperature changes, the first ring 8 can be more easily deformed in this region by the carrier element 16.

Figure 2:
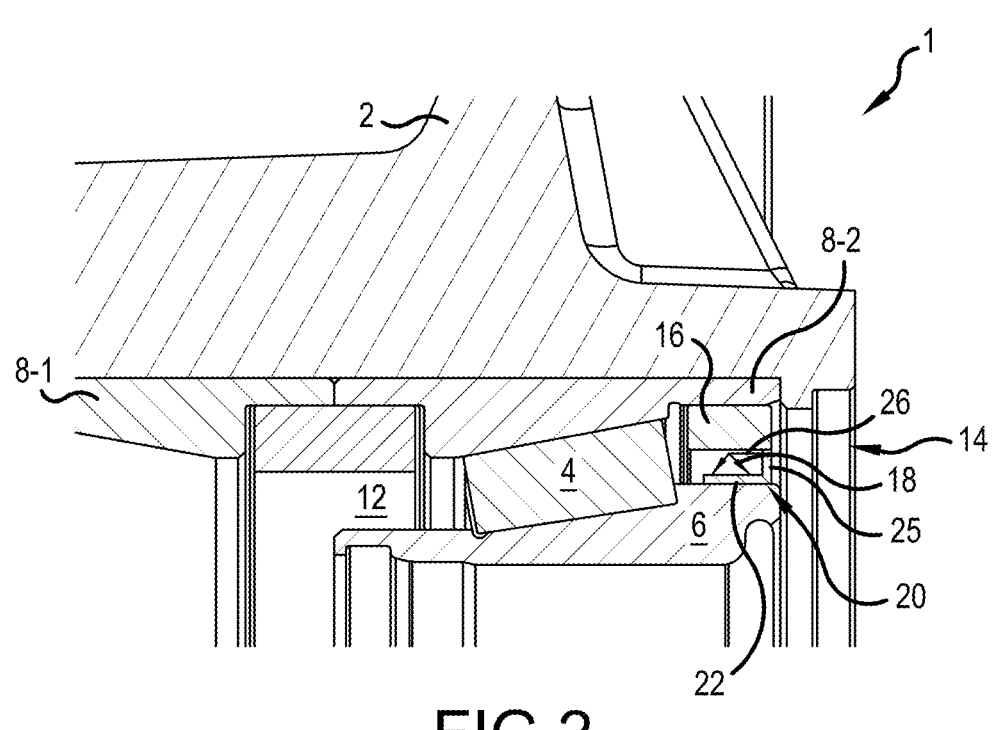
FIG. 2 shows a schematic sectional view through a bearing assembly according to a second embodiment.
Figure 3:
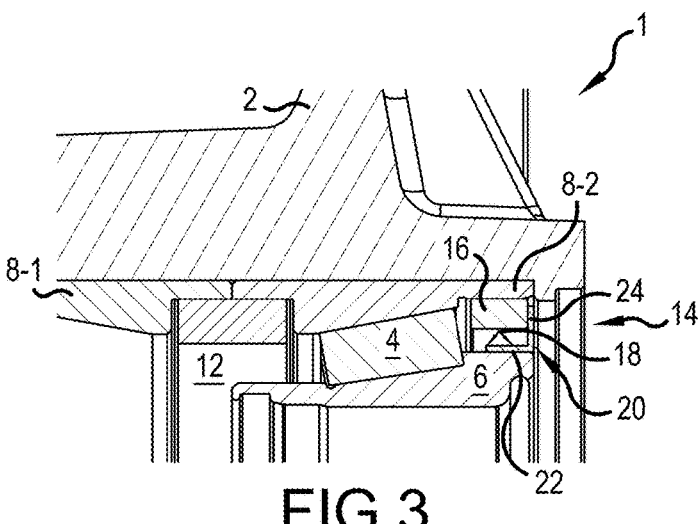
FIG. 3 shows a schematic sectional view through a bearing assembly according to a third embodiment.

FIGS. 2 and 3 each show a bearing assembly 1 according to a second embodiment and third embodiment, respectively. The bearing assemblies 1 of FIG. 2 and of FIG. 3 differ from the bearing assembly 1 of FIG. 1 in that the seal unit 14 further includes a flinger 20. The flinger 20 has an axially extending section 22 and a radially extending section 24, wherein the axially extending section 22 abuts against the second ring 6. Furthermore, the axially extending section 22 and/or the radially extending section 24 is configured to form a slip surface for the seal lips 18 of the seal unit 14.

Both in the embodiment shown in FIG. 2 and in the embodiment shown in FIG. 3, the radially extending section 24 is configured to form an annular gap or a gap seal with the carrier element 16. This gap further reduces the risk of external contaminants, such as dust, dirt, and other particles, reaching and damaging the at least one seal lip 18 and/or penetrating into the bearing interior 12.

In FIG. 2, the radial section 24 extends in the radial direction to an extent that an annular gap 25 is formed between a radial end of the radial section 24 and the carrier element 16. In this case, the axial end surface of the radial section 24 and the axial end of the carrier element 16 can be oriented in alignment with each other. In FIG. 3, the radial section 24 extends axially outside the axial end surface of the carrier element 16, such that in this region, the carrier element 16 and the radial section 24 at least partially axially oppose each other and form a gap. This further reduces the risk of external contaminants penetrating into the bearing interior 12.

Figure 4:
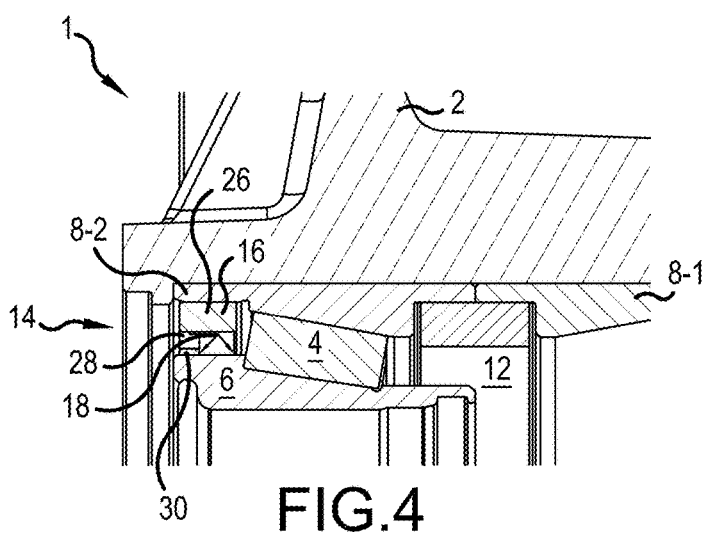
FIG. 4 shows a schematic sectional view through a bearing assembly according to a fourth embodiment.

FIG. 4 shows a bearing assembly 1 according to a fourth embodiment. The bearing assembly 1 of FIG. 4 differs from the bearing assembly 1 of FIG. 1 in that the carrier element 16 includes a first leg 26 that extends axially and a second leg 28 that extends radially from the first leg 26 and is formed one-piece or integral with the first leg 26. Preferably, the second leg 28 extends in the radial direction to the extent that an annular gap 30 is formed between the radial end of the second leg 28 and the second ring 6. This further reduces the risk of external contaminants, such as dust, dirt, and other particles, reaching and damaging the at least one seal lip 18 and/or penetrating into the bearing interior 12.

FIG. 5 shows a bearing assembly 1 according to a fifth embodiment. The bearing assembly 1 of FIG. 5 differs from the bearing assembly 1 of FIG. 4 in that the second leg 28 is formed as a separate clamping ring that is attached to the first leg 26 by a press fit. In addition, the second leg 28 formed as clamping ring can advantageously be formed to attach the at least one seal lip 18 to the carrier element 16. The second leg 28 formed as clamping ring can be formed from the same material as the carrier element 16. Alternatively, the second leg 28 formed as a clamping ring can be formed from a fourth material with a fourth coefficient of thermal expansion, wherein the fourth coefficient of thermal expansion is substantially at least as high as the first coefficient of thermal expansion.

In summary, by providing the seal unit 14 that includes a carrier element 16 that is formed from a material that has a coefficient of thermal expansion that is substantially at least as high as the coefficient of thermal expansion of the hub 2, a relative rotation of the pressed-in ring 8 in the hub 2 can be prevented in the high operating temperature range. In addition, this also makes it possible to be able to reduce the critically high circumferential stresses in the hub 2 in the low operating temperature range so far that they remain significantly below the permissible material limit.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

REFERENCE NUMBER LIST

1 Bearing assembly
2 Hub
4 Rolling element
6 Second ring
8 First ring
10 Rotational axis
12 Bearing interior 14 Seal unit
16 Carrier element
18 Seal lips
20 Flinger
21 Shoulder
22 Axial section
24 Radial section
25 Gap
26 First leg
28 Second leg
30 Gap

I claim:

1. A bearing assembly comprising:
a component formed of a first material with a first coefficient of thermal expansion;
at least one first, outer ring adapted to be attached by a press fit to the component and formed of a second material with a second coefficient of thermal expansion, the second coefficient of friction being lower than the first coefficient of thermal expansion;
at least one second, inner ring defining a bearing interior with the first ring, at least one of the first ring and the second ring being rotatable relative to the other one of the first ring and the second ring; and
at least one seal unit disposed between the inner ring and the outer ring and configured to seal an axially outer side of the bearing assembly, the seal unit including a carrier element disposed against an inner surface of the at least one first ring and formed of a third material with a third coefficient of thermal expansion, wherein the third coefficient of thermal expansion is at least as high as the first coefficient of thermal expansion, the carrier element being nonengaged with the component and deforms the at least one first ring when the carrier element expands with increasing temperature so as to maintain the press fit between the at least one first ring and the component.

2. The bearing assembly according to claim 1, wherein the carrier element is inserted with a press fit on the axially outer side of the bearing assembly.

3. The bearing assembly according to claim 1, wherein the seal unit includes at least one seal lip disposed on the carrier element and configured to seal the bearing interior.

4. The bearing assembly according to claim 1, wherein the carrier element includes at least one first leg extending axially and sealingly abutting against the at least one first ring.

5. The bearing assembly according to claim 4, wherein the carrier element includes at least one second leg extending radially from the first leg such that a gap is defined radially between the second leg and the at least one second ring.

6. The bearing assembly according to claim 5, wherein the second leg is integrally formed with the first leg.

7. The bearing assembly according to claim 5, wherein the second leg is formed as a separate clamping ring attached by a press fit to the first leg.

8. The bearing assembly according to claim 7, wherein the second leg is configured to attach the at least one seal lip to the carrier element and/or the second leg is formed from a fourth material with a fourth coefficient of thermal expansion, wherein the fourth coefficient of thermal expansion is substantially at least as high as the first coefficient of thermal expansion.

9. The bearing assembly according to claim 1, wherein the at least one seal unit further includes at least one flinger having an axially extending section sealingly abutting against the second ring and configured to form a slip surface for the at least one seal lip and at least one radially extending section configured to form a gap with the carrier element.

10. The bearing assembly according to claim 1, wherein the third coefficient of thermal expansion is substantially equal to the first coefficient of thermal expansion.

11. The bearing assembly according to claim 1, wherein the first material and the third material are identical to each other.

12. The bearing assembly according to claim 1, wherein the first material and the third material are each aluminum, an aluminum alloy and/or a magnesium alloy and the second material is steel.

13. The bearing assembly according to claim 1, wherein the component is a hub of a wheel bearing assembly.

14. A bearing assembly comprising:

a component formed of a first material with a first coefficient of thermal expansion;

at least one first, outer bearing ring adapted to be attached by a press fit to the component and formed of a second material with a second coefficient of thermal expansion, the second coefficient of friction being lower than the first coefficient of thermal expansion;

at least one second, inner bearing ring disposed within er around the first bearing ring so as to define a bearing interior, at least one of the first ring and the second ring being rotatable relative to the other one of the first ring and the second ring about a rotational axis; and at least one seal unit configured to seal an axially outer side of the bearing assembly and including a carrier element disposed against an inner surface of and press fit to the first bearing ring such that a portion of the first bearing ring is disposed between the carrier element and the component, the carrier element being formed of a third material with a third coefficient of thermal expansion and the third coefficient of thermal expansion is at least as high as the first coefficient of thermal expansion, the carrier element being nonengaged with the component and deforms the at least one first ring when the carrier element expands with increasing temperature so as to maintain the press fit between the at least one first ring and the component.

15. The bearing assembly according to claim 14, wherein the carrier element includes an axially-extending first leg press fit to the first bearing ring and at least one second leg extending radially from the first leg such that an annular gap is defined radially between the second leg and the at least one second bearing ring.

16. The bearing assembly according to claim 15, wherein the second leg is integrally formed with the first leg or is formed as a separate ring attached to the first leg by a press fit and formed of a fourth material with a fourth coefficient of thermal expansion at least as high as the first coefficient of thermal expansion.

17. The bearing assembly according to claim 14, wherein the seal unit includes at least one seal lip disposed on the carrier element and configured to seal the bearing interior.

\*    \*    \*    \*    \*